(12) United States Patent
Jian et al.

(10) Patent No.: US 11,294,920 B2
(45) Date of Patent: Apr. 5, 2022

(54) METHOD AND APPARATUS FOR ACCESSING TIME SERIES DATA IN MEMORY

(71) Applicant: Beijing Baidu Netcom Science and Technology Co., Ltd., Beijing (CN)

(72) Inventors: Hengyi Jian, Beijing (CN); Dayu Shen, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 506 days.

(21) Appl. No.: 15/902,440

(22) Filed: Feb. 22, 2018

(65) Prior Publication Data

US 2019/0005101 A1 Jan. 3, 2019

(30) Foreign Application Priority Data

Jun. 30, 2017 (CN) .......................... 201710524250.9

(51) Int. Cl.
*G06F 16/2458* (2019.01)
*G06F 16/22* (2019.01)
*G06F 16/242* (2019.01)
*G06F 16/23* (2019.01)

(52) U.S. Cl.
CPC ...... *G06F 16/2477* (2019.01); *G06F 16/2246* (2019.01); *G06F 16/2322* (2019.01); *G06F 16/2343* (2019.01); *G06F 16/242* (2019.01)

(58) Field of Classification Search
None
See application file for complete search history.

(56) References Cited

U.S. PATENT DOCUMENTS

| | | | | |
|---|---|---|---|---|
| 5,440,730 | A | * | 8/1995 | Elmasri .................. G06F 16/00 |
| 6,192,051 | B1 | * | 2/2001 | Lipman ................. H04L 45/742 |
| | | | | 370/389 |
| 2003/0204513 | A1 | * | 10/2003 | Bumbulis ........... G06F 16/2246 |
| 2005/0182776 | A1 | * | 8/2005 | Yennie ................ G06F 16/2264 |

(Continued)

FOREIGN PATENT DOCUMENTS

| | | |
|---|---|---|
| CN | 103186537 A | 7/2013 |
| CN | 103488727 A | 1/2014 |

(Continued)

OTHER PUBLICATIONS

Namiot et al., Time Series Databases, Oct. 2015 (Year: 2015).*

*Primary Examiner* — Yu Zhao
(74) *Attorney, Agent, or Firm* — Nixon Peabody LLP (57) ABSTRACT

An objective of the present disclosure is to provide a method and apparatus for accessing time series data. The method according to the present disclosure comprises: acquiring time series query information; determining corresponding time offset information based on the time series query information, the time offset information including hour information, minute information, and offset information; finding a leaf node in a time tree corresponding to the time offset information based on the time offset information; and querying in the leaf node based on the offset information, to acquire corresponding time series data. Advantages of the present disclosure lie in possessing a lower complexity and improving query efficiency of the time series data. In addition, the memory is less occupied, and out-of-order writing is supported.

19 Claims, 3 Drawing Sheets

(56) References Cited

U.S. PATENT DOCUMENTS

| | | | | |
|---|---|---|---|---|
| 2009/0327215 | A1* | 12/2009 | Zhu | H04N 21/6437 |
| 2010/0076999 | A1* | 3/2010 | Okazaki | G06F 16/93 |
| | | | | 707/772 |
| 2010/0328115 | A1* | 12/2010 | Binnig | G06F 16/24561 |
| | | | | 341/51 |
| 2012/0197900 | A1* | 8/2012 | Mandre | G06F 16/2246 |
| | | | | 707/743 |
| 2014/0074841 | A1* | 3/2014 | Majnemer | G06F 16/2308 |
| | | | | 707/737 |
| 2015/0281389 | A1* | 10/2015 | Firsov | G06F 16/282 |
| | | | | 709/214 |
| 2015/0331910 | A1* | 11/2015 | Srinivasan | G06F 16/24553 |
| | | | | 707/706 |

FOREIGN PATENT DOCUMENTS

| | | |
|---|---|---|
| CN | 104750708 A | 7/2015 |
| CN | 106844555 A | 6/2017 |

* cited by examiner

METHOD AND APPARATUS FOR ACCESSING TIME SERIES DATA IN MEMORY

CROSS-REFERENCE TO RELATED APPLICATION

This application is related to and claims the priority from Chinese Application No. 201710524250.9, filed on Jun. 30, 2017, entitled "Method and Apparatus for Accessing Time Series Data in Memory," the entire disclosure of which is incorporated herein by reference.

TECHNICAL FIELD

The present disclosure relates to the field of computer technology, and specifically to a method and apparatus for accessing time series data in a memory.

BACKGROUND

With the development of computer and Internet technology, time series databases are becoming more and more widely used. A time series database is a database storing massive time series data (i.e., every piece of data corresponds to a piece of time point information), which can support queries for the massive data.

A main use scenario of the time series database is a scenario of monitoring and querying, and users will frequently and periodically query data in last minute, last hour or last day. In this way, the time series database is required to be able to rapidly write and read the recent data.

A typical idea is to cache the time series data in the last hour or day into memory while persisting these data to a hard disk, thereby implementing the rapid writhing and reading for the recent data.

However, how data are organized in the memory will greatly affect speeds of reading and writing data (since the time series database writes more and reads less, the writing speed should be first optimized, followed by the reading speed). On the other hand, costs of the memory are much higher than the hard disk, and accordingly, how to reduce memory footprint will affect costs of storing data. Finally, a size of the memory is limited. Therefore, only the data in the last hour or day can be stored, and data over time need to be cleared out. Accordingly, how to quickly clear out these stale data will affect system performances.

To solve these problems, the existing techniques include the Gorilla memory caching system of Facebook, etc. Specifically, the Gorilla memory caching system of Facebook creates an index from an id of every time series to data using a two-level index structure. Data in every time series (timestamps and values) are separated by two hours, and data in every two hours are kept in one string. The string of the current two hours may only be written in an append mode, and previous strings are read only. However, the following problems exist: 1) the data in two hours are kept into one string structure, and when string capacity is not enough, larger space needs to be applied and original data need to be copied to new space, resulting in a poor write performance; 2) the data need to be found in the string of the two hours with a time complexity of O(N), resulting in a poor query performance; 3) the index structure is merely for the id of the time series, and all time series need to be looped through if the stale data need to be cleared out, resulting in lower clearing efficiency; and 4) there is a limitation to the data in the system that the time series data must be written in a sequence of timestamps, and out-of-order writing data is not supported, resulting in a limitation to use scenarios.

In addition, there is another idea that a binary sort tree organization is used for cache data to ensure that the data are sorted according to the timestamps, which makes the query convenient. The problems of this approach lie in that: 1) a non-balanced binary sort tree is used, resulting in a poor query performance, and a requirement for the time complexity of O(n) in a worst case scenario; and 2) every node in the binary tree needs to keep a left pointer and a right pointer, which requires to consume a large amount of memory, resulting in higher costs.

SUMMARY

An objective of the present disclosure is to provide a method and apparatus for accessing time series data.

According to solutions of the present disclosure, a method for accessing time series data is provided. Time series data are stored into leaf nodes of a time tree, and the method comprises:

acquiring time series query information;

determining corresponding time offset information based on the time series query information, the time offset information including hour information, minute information, and offset information;

finding a leaf node in a time tree corresponding to the time offset information based on the time offset information; and querying in the leaf node based on the offset information, to acquire corresponding time series data.

According to solutions of the present disclosure, an accessing apparatus for accessing time series data is provided. Time series data are stored into leaf nodes of a time tree, and the accessing apparatus comprises:

a first acquiring unit, configured to acquire time series query information;

a first determining unit, configured to determine corresponding time offset information based on the time series query information, the time offset information including hour information, minute information, and offset information;

a first querying unit, configured to find a leaf node in a time tree corresponding to the time offset information based on the time offset information; and a second querying unit, configured to query in the leaf node based on the offset information, to acquire corresponding time series data.

According to solutions of the present disclosure, a computer device is provided. The computer device comprises a memory; a processor; and computer programs stored on the memory and executable on the processor, wherein the processor, when executing the programs, implements the method.

According to solutions of the present disclosure, a computer readable storage medium storing computer programs, wherein the programs, when executed by a processor, implement the method.

Compared with the existing techniques, the present disclosure has advantages as follows. According to the solutions of the present disclosure, by creating a two-level tree structure, a time complexity of finding the leaf node at a root node of the time tree is merely O (1), while a time complexity of finding in the leaf node is O(log N) since a method such as a bisection method may be used. Apparently, compared with O(N) in the existing techniques, the present solution has a lower complexity and improves query efficiency of time series data. In addition, compared with the binary tree in the existing techniques, the data structure according to the present disclosure occupies less memory, and can conveniently implement cleaning for stale data in units of hours by using the two-level index at the hour information. Moreover, in the solutions, a situation of out-of-order writing can also be conveniently supported.

BRIEF DESCRIPTION OF THE DRAWINGS

After reading detailed descriptions of non-limiting embodiments with reference to the following accompanying drawings, other features, objectives and advantages of the present disclosure will be more apparent.

The same or similar reference signs in the accompanying drawings represent the same or similar components.

DETAILED DESCRIPTION OF EMBODIMENTS

The present disclosure will be further described below in detail in combination with the accompanying drawings.

An accessing apparatus performing a method of the present disclosure is implemented by a computer device. The computer possesses a memory, a processor and computer programs stored on the memory and executable on the processor. The processor implements the method performed by the accessing apparatus when executing the computer programs corresponding to programs. In addition, the corresponding computer programs are stored on a computer readable storage medium, so that the processor may implement the method corresponding to the accessing apparatus when executing the programs.

The computer device includes an electronic device that can automatically calculate numerical values and/or process information according to preset or stored instructions, hardware of which includes, but is not limited to, a microprocessor, an application specific integrated circuit (ASIC), a field programmable gate array (FPGA), a digital processing unit (DSP), an embedded device, etc. The computer device includes a network device and/or a user device.

The user device includes, but is not limited to, any electronic product that may perform human-machine interaction with a user by touching, such as a personal computer, a tablet PC, a smart phone, a PDA, a game machine, or an IPTV, etc.

The network device includes, but is not limited to, a single network server, a server group composed of multiple network servers, or a cloud-computing based cloud composed of a large number of host computers or network servers. As a kind of distributed computing, the cloud computing is a super virtual computer composed of a group of loosely coupled computer sets.

The network where the network device is located includes, but is not limited to, an internet, a wide area network, a metropolitan area network, a local area network, a VPN network, etc. It should be noted that the user device, the network device, and the network are merely examples, and if other existing or possible future network devices and networks may be suitable for the present disclosure, which should be covered by the scope of the present disclosure and incorporated herein by reference.

The method and apparatus according to the present disclosure may be applied to access time series data in a memory, preferably, may be applied to access time series data in a cache.

The time series data according to the present disclosure are stored into leaf nodes of a time tree.

The time series data include data information having temporal characteristics, for example, monitoring screen information corresponding to a certain time point, in another example, cpu frequency information corresponding to a certain time point, etc.

Preferably, the time series data according to the present disclosure include corresponding time point information.

Preferably, the time point information is represented using timestamps.

According to accuracy and precision or system differences, the time point information may be represented in seconds or milliseconds, etc.

For example, if a system timestamp uses a second as a unit, and start time is 0:0:0, a timestamp corresponding to next 1:40:30 is 6030 seconds. If a millisecond is used as a unit, a timestamp corresponding to the current 1:40:30 is $6030*10^3$ milliseconds.

It should be appreciated by those skilled in the art that, the above descriptions are merely examples. In general, a mode of accumulating from a certain standard time to the present is often used in a system. For instance, a timestamp of a Unix system is a number of seconds or milliseconds or the like accumulated to the present from the Universal Time Coordinated (UTC, Coordinated Universal Time) of 00:00:00 on Jan. 1, 1970.

Those skilled in the art should be able to determine the precision used by the timestamp according to actual situations and requirements.

The time series data according to the present disclosure uses a two-level index when being stored, wherein a primary index includes an hour pointer. The time series data may determine a corresponding hour pointer based on hour information corresponding to time point information of the time series data. The hour pointer points to a time tree corresponding to the hour.

The time tree is used to store time series data and offset information of the time series data in at least one minute.

The time tree includes a plurality of leaf nodes, and the leaf nodes are used to store time series data and offset information the time series data within one minute.

In the time tree, a leaf node corresponding to a minute is pointed to by a tree node or other array elements.

Preferably, according to an embodiment of the present disclosure, the time tree includes minute nodes corresponding to each minute, and the minute node includes an offset node. The leaf node stores at least one piece of time series data of the minute and offset information corresponding to the time series data.

Preferably, according to another preferable embodiment of the present disclosure, the time tree maintains an array having a length of 60 at a root node, each element of the array corresponds to a minute pointer, and the minute pointer points to the leaf node.

The offset information includes a time offset within one minute. The offset information may be represented according to the precision used by the time point information.

Figure 1:
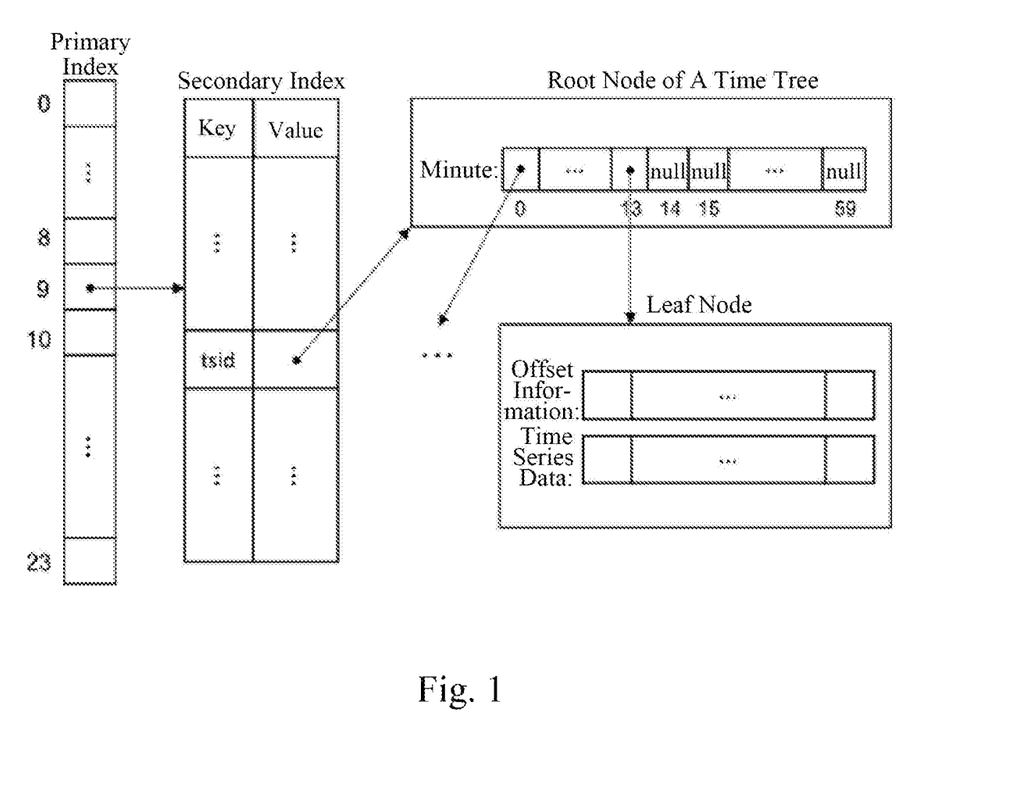
FIG. 1 is a schematic structural diagram of a data structure for accessing time series data in a memory according to a preferable embodiment of the present disclosure.

Referring to FIG. 1, FIG. 1 is a schematic structural diagram of a data structure for accessing time series data according to a preferable embodiment of the present disclosure.

FIG. 1 illustrates a primary index, a secondary index, a time tree and a data structure of a leaf node.

The primary index adopts an array from 0 to 23, each element in the array is an hour pointer. For example, an element of bit 0 is an hour pointer of 0 h. This hour pointer points to the secondary index, and the secondary index according to the embodiment is organized using a key-value pair. The key tsid corresponds to hour information, and the value is a pointer of a time tree corresponding to the hour.

A root node of the time tree includes an array having a length of 60, in which each element corresponds to one minute. When time series data corresponding to the minute exist, the array element of the minute points to a leaf node, and the leaf node includes an array for respectively storing offset information and time series data. When there is no time series data in a certain minute, the array element of the minute is set to null.

Figure 2:
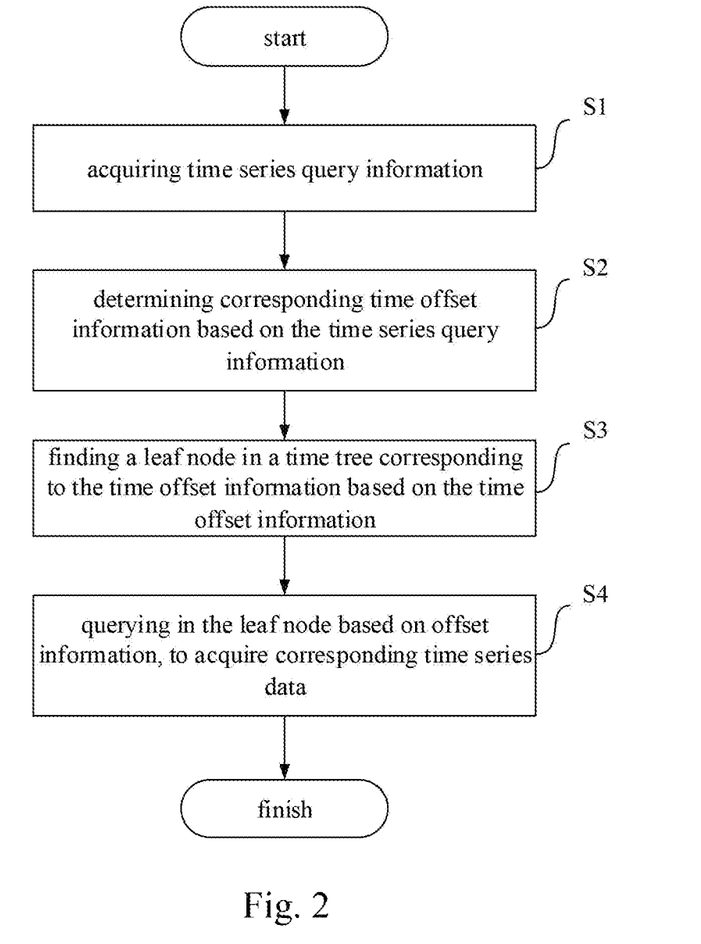
FIG. 2 is a flowchart of a method for accessing time series data in a memory according to the present disclosure.

Next, the present disclosure will be further described in combination with a flowchart of a method in FIG. 2. FIG. 2 is a flowchart of a method for accessing time series data in a memory according to the present disclosure. The method according to the present disclosure includes step S1, step S2, step S3 and step S4 performed by the accessing apparatus.

In step S1, the accessing apparatus acquires time series query information.

The time series query information includes at least one piece of time point information.

Preferably, the time series query information may be one piece of time information including multiple pieces of time point information.

Specifically, the accessing apparatus receives the time series query information from a network or submitted locally.

Next, in step S2, the accessing apparatus determines corresponding time offset information based on the time series query information.

The time offset information includes hour information, minute information, and offset information.

Specifically, the time offset information corresponding to the time series query information is determined through a corresponding unit conversion.

Preferably, when the time series query information includes the multiple pieces of time point information, time offset information corresponding to each piece of time point information is respectively determined.

For example, when a timestamp uses a millisecond as a unit, the time offset information corresponding to the time point information may be determined using the following formulas:

hour information=(time point information/3,600,000)% 24;

minute information=(time point information/60,000)% 60; and offset information=time point information % 60,000.

In the present disclosure, "/" represents division, and represents modulo division.

Those skilled in the art should be able to determine an approach required to determine the time offset information according to actual situations and requirements.

Next, in step S3, the accessing apparatus finds a leaf node in a time tree corresponding to the time offset information based on the time offset information.

The leaf node stores at least one piece of time series data within one minute and offset information corresponding to the time series data.

The accessing apparatus acquires a corresponding hour pointer according to the hour information, and acquires a corresponding time tree based on the hour pointer. Then, the accessing apparatus determines a leaf node corresponding to the minute information in the time tree based on the minute information.

Next, in step S4, the accessing apparatus queries in the leaf node based on the offset information, to acquire corresponding time series data.

Preferably, the accessing apparatus may query based on the offset information using a bisection method, to acquire the time series data.

According to a first example of the present disclosure, a user submits one piece of time series query information: "use frequency information of a cpu from 1:30:05 to 1:30:10." The current accessing apparatus uses seconds as time precision, and a storage structure of the time series data is shown in FIG. 1. After the accessing apparatus acquires the time series query information in step S1, it is determined that time point information corresponding to the time series query information includes 5 items from 5405 sec to 5410 sec.

Next, in step S2, the accessing apparatus respectively determines time offset information corresponding to each piece of the time point information. For example, for the time point information 5405, its hour information=(5405/3600) % 24=1; its minute information=(5405/60) % 60=30; and its offset information=(5405%60)=5. In step S3, the accessing apparatus determines an hour pointer corresponding to an item numbered 1 in the primary index according to the hour information 1, to acquire a time tree corresponding to the hour pointer.

Next, in step S4, a storage device queries an array element corresponding to the 30$^{th}$ minute in an array of a root node of the time tree, queries an element having offset information 5 in an offset information array of a leaf node pointed to by the array element based on the leaf node, and acquires time series data having the same subscript with the element having the offset information 5, as the time series data acquired by querying.

According to a preferable embodiment of the present disclosure, the method according to the present disclosure further includes step S5 (not shown) and S6 (not shown).

In step S5, the accessing apparatus determines whether out-of-order inserted time series data exists in the leaf node.

Specifically, one piece of indication information may be set in the leaf node in the minute. When the time series data are inserted in sequence, the indication information is "true", and when the time series data are out-of-order inserted, the indication information is "false". Accordingly, the accessing apparatus determines whether the current time series data are out-of-order inserted, according to the indication information.

Next, in step S6, the accessing apparatus sorts the corresponding time series data based on the offset information, when the out-of-order inserted time series data exists.

Specifically, the accessing apparatus sorts the time series data according to a size of the offset information.

Those skilled in the art should be able to select a sorting approach according to actual situations and requirements, which will not be repeatedly described here.

According to a preferable embodiment of the present disclosure, the method according to the present disclosure further includes step S7 (not shown), step S8 (not shown), step S9 (not shown) and step S10 (not shown).

In step S7, the accessing apparatus acquires the time series data.

The accessing apparatus may acquire the time series data in real time based on the Internet of Things, or acquire the time series data from the network, or acquire the time series data from the local storage device.

Specifically, the accessing apparatus acquires data values of the time series data and time point information corresponding to the data values.

Next, in step S8, the accessing apparatus determines the time offset information of the time series data according to the time point information of the time series data.

The approach used by the accessing apparatus to determine the time offset information of the time series data according to the time point information of the time series data has been mentioned in the description in step S2 that the accessing apparatus determines corresponding time offset information based on the time series query information, which will not be repeatedly described here.

Next, in step S9, the accessing apparatus finds the leaf node in the time tree corresponding to the time offset information according to the time offset information.

The approach used by the accessing apparatus to find the leaf node in the time tree corresponding to the time offset information according to the time offset information is identical with or similar to the approach used by the accessing apparatus to find the leaf node in the time tree corresponding to the time offset information based on the time offset information in step S3, which will not be repeatedly described here.

Next, in step S10, the accessing apparatus inserts the time series data and the offset information corresponding to the time series data into the leaf node after the leaf node is found.

Specifically, the accessing apparatus may insert the time series data and the offset information of the time series data into the end of the array based on a rule of inserting in sequence, or the accessing apparatus may insert out of sequence. That is, the accessing apparatus may correspondingly insert the time series data and the offset information of the accessing apparatus may into a certain position of the array at random.

Preferably, subscripts of the inserted time series data and of the inserted offset information of the time series data in the storage structure are consistent.

According to a preferable solution of the present solution, before step S10, whether storage space of the leaf node is full is first determined. When the storage space of the leaf node is full, the accessing apparatus allocates more storage space to the leaf node and stores the time series data and the offset information of the time series data into the storage space of the leaf node.

Preferably, after allocating more storage space to the leaf node, the accessing apparatus first copies the originally stored time series data and corresponding offset information to new storage space, and then inserts the current time series data and offset information.

According to a more preferable solution of the present solution, when querying the leaf node, the accessing apparatus respectively determines whether a storage element corresponding to each piece of information in the time offset information exists. When the storage element corresponding to each piece of information in the time offset information does not exist, a new storage element is created.

Specifically, the accessing apparatus determines whether the time tree corresponding to the hour information exists according to the hour information in the time offset information, and when the time tree does not exist, a new time tree corresponding to the hour information is created; next, the accessing apparatus determines whether a minute element corresponding to the minute information exists in a local time tree corresponding to the hour information according to the minute information in the time offset information, and when there does not exist the minute element, a new minute element corresponding to the minute information is created; and then, the accessing apparatus determines whether the leaf node corresponding to the offset information exists in a minute node corresponding to the hour information, according to the offset information in the time offset information, and when there does not exist the leaf node, a new leaf node corresponding to the offset information is created.

Preferably, the time tree includes a piece of space size information, and the space size information is used to indicate a maximum value of array space currently used in each leaf node.

When the new leaf node is created, storage space corresponding to the to be created new leaf node is determined according to a leaf node having largest space in the time tree corresponding to the to be created new leaf node.

Preferably, when the new space allocated to the leaf node by the accessing apparatus is larger than the space size information in the foregoing time tree, the space size information of the time tree is updated to size information of the new space.

According to a preferable solution of the present disclosure, when the accessing apparatus writes/reads the time series data, data in a corresponding storage structure are locked.

Specifically, when the accessing apparatus queries the storage structure corresponding to the offset information in the leaf node, the leaf node is first locked to keep data in the leaf node from being read/written by other users at the same time. After corresponding time series data are read/written, the leaf node is unlocked to allow other users to read/write the data in the leaf node.

Preferably, the corresponding leaf node is locked before step S3 or step S9, and unlocked after step S4 or step S10.

According to the solution of the present disclosure, by creating a two-level tree structure, a time complexity of finding leaf nodes at the root node of the time tree is only O (1), while a time complexity of finding in leaf nodes is O (log N) since a method such as a bisection method may be used. Apparently, compared with O(N) in the existing techniques, the present solution has a lower complexity and improves query efficiency of time series data. In addition, compared with the binary tree in the existing techniques, the data structure according to the present disclosure occupies less memory, and can conveniently implement cleaning for stale data in units of hours by using the two-level index at the hour information. Moreover, in the solution, a situation of out-of-order writing can also be conveniently supported.

Figure 3:
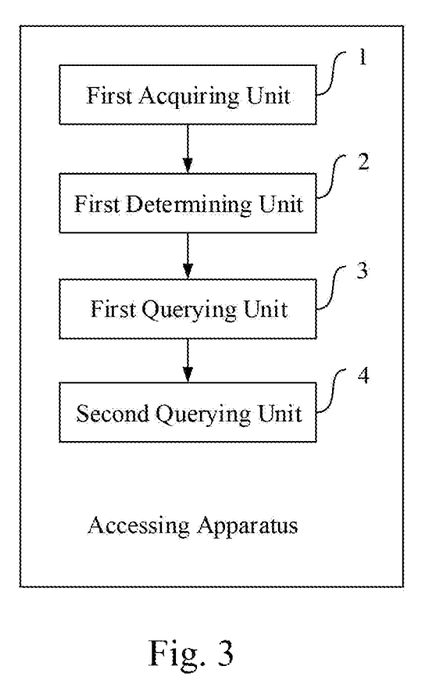
FIG. 3 is a schematic structural diagram of an accessing apparatus for accessing time series data in a memory according to the present disclosure.

Next, the present disclosure will be further described in combination with a schematic structural diagram in FIG. 3. FIG. 3 illustrates an accessing apparatus for accessing time series data in a memory according to the present disclosure. The accessing apparatus according to the present disclosure includes a unit configured to acquire time series query information (hereinafter referred to as "a first acquiring unit 1"); a unit configured to determine corresponding time offset information based on the time series query information (hereinafter referred to as "a first determining unit 2"); a unit configured to find a leaf node in a time tree corresponding to the time offset information based on the time offset information (hereinafter referred to as "a first querying unit 3"); and a unit configured to query in the leaf node based on the offset information, to acquire corresponding time series data (hereinafter referred to as "a second querying unit 4").

The first acquiring unit 1 acquires the time series query information.

The time series query information includes at least one piece of time point information.

Preferably, the time series query information may be one piece of time information including multiple pieces of time point information.

Specifically, the first acquiring unit 1 receives the time series query information from a network or submitted locally.

Next, the first determining unit 2 determines the corresponding time offset information based on the time series query information.

The time offset information includes hour information, minute information, and offset information.

Specifically, the time offset information corresponding to the time series query information is determined through a corresponding unit conversion.

Preferably, when the time series query information includes the multiple pieces of time point information, time offset information corresponding to each piece of time point information is respectively determined.

For example, when a timestamp uses a millisecond as a unit, the time offset information corresponding to the time point information may be determined using the following formulas:

hour information=(time point information/3,600, 000)% 24;

minute information=(time point information/60, 000)% 60; and offset information=time point information % 60,000.

In the present disclosure, "/" represents division, and represents modulo division.

Those skilled in the art should be able to determine an approach required to determine the time offset information according to actual situations and requirements.

Next, the first querying unit 3 finds the leaf node in the time tree corresponding to the time offset information based on the time offset information.

The leaf node stores at least one piece of time series data within one minute and offset information corresponding to the time series data.

The first querying unit 3 acquires a corresponding hour pointer according to the hour information, and acquires a corresponding time tree based on the hour pointer. Then, the first querying unit 3 determines a leaf node corresponding to the minute information in the time tree based on the minute information.

Next, the second querying unit 4 queries in the leaf node based on the offset information, to acquire the corresponding time series data.

Preferably, the second querying unit 4 may query based on the offset information using a bisection method, to acquire the time series data.

According to a first example of the present disclosure, a user submits one piece of time series query information: "use frequency information of a cpu from 1:30:05 to 1:30:10." The current accessing apparatus uses seconds as time precision, and a storage structure of the time series data is shown in FIG. 1. After the first acquiring unit 1 acquires the time series query information query, it is determined that time point information corresponding to the time series query information includes 5 items from 5405 sec to 5410 sec.

Next, the first determining unit 2 respectively determines time offset information corresponding to each piece of the time point information. For example, for the time point information 5405, its hour information=(5405/3600) % 24=1; its minute information=(5405/60) % 60=30; and its offset information=(5405% 60)=5. The first querying unit 3 determines an hour pointer corresponding to an item numbered 1 in a primary index according to the hour information 1, to acquire a time tree corresponding to the hour pointer, and queries an array element corresponding to the 30$^{th}$ minute in an array of a root node of the time tree. Next, based on a leaf node pointed to by the array element, the second querying unit 4 queries an element having offset information 5 in an offset information array of the leaf node, and acquires time series data having the same subscript with the element having the offset information 5, as the time series data acquired by querying.

According to a preferable embodiment of the present disclosure, the accessing apparatus according to the present disclosure further includes a unit configured to determine whether out-of-order inserted time series data exists in the leaf node (hereinafter referred to as "a determining unit", not shown); and a unit configured to sort the corresponding time series data based on the offset information when the out-of-order inserted time series data exists (hereinafter referred to as "a sorting unit", not shown).

The determining unit determines whether out-of-order inserted time series data exists in the leaf node.

Specifically, one piece of indication information may be set in the leaf node in the minute. When the time series data are inserted in sequence, the indication information is "true", and when the time series data are inserted out of sequence, the indication information is "false". Accordingly, the determining unit determines whether the current time series data are inserted in an out-of-order according to the indication information.

Next, the sorting unit sorts the corresponding time series data based on the offset information, when the out-of-order inserted time series data exists.

Specifically, the sorting unit sorts the time series data according to a size of the offset information.

Those skilled in the art should be able to select a sorting approach according to actual situations and requirements, which will not be repeatedly described here.

According to a preferable embodiment of the present disclosure, the accessing apparatus according to the present disclosure further includes a unit configured to acquire the time series data (hereinafter referred to as "a second acquiring unit", not shown); a unit configured to determine the time offset information of the time series data according to time point information of the time series data (hereinafter referred to as "a second determining unit", not shown); a unit configured to find the leaf node in the time tree corresponding to the time offset information according to the time offset information (hereinafter referred to as "a third querying unit", not shown); and a unit configured to insert the time series data and the offset information corresponding to the time series data into the leaf node after the leaf node is found (hereinafter referred to as "an inserting unit", not shown).

The second acquiring unit acquires the time series data.

The second acquiring unit may acquire the time series data in real time based on the Internet of Things, or acquire the time series data from the network, or acquire the time series data from the local storage device.

Specifically, the second acquiring unit acquires data values of the time series data and time point information corresponding to the data values.

Next, the second determining unit determines the time offset information of the time series data according to the time point information of the time series data.

The approach used by the second determining unit to determine the time offset information of the time series data according to the time point information of the time series data has been mentioned in the description that the first determining unit 2 determines the corresponding time offset information based on the time series query information, which will not be repeatedly described here.

Next, the third querying unit finds the leaf node in the time tree corresponding to the time offset information according to the time offset information.

The approach used by the third querying unit to find the leaf node in the time tree corresponding to the time offset information according to the time offset information is identical with or similar to the approach used by the first querying unit 3 to find the leaf node in the time tree corresponding to the time offset information based on the time offset information, which will not be repeatedly described here.

Next, the inserting unit inserts the time series data and the offset information corresponding to the time series data into the leaf node after the leaf node is found.

Specifically, the inserting unit may insert the time series data and the offset information of the time series data into the end of the array based on a rule of inserting in sequence, or the inserting unit may insert out of sequence. That is, the inserting unit may correspondingly insert the time series data and the offset information of the time series data into a certain position of the array at random.

Preferably, subscripts of the inserted time series data and of the inserted offset information of the time series data in the storage structure are consistent.

According to a preferable solution of the present solution, before the time series data are inserted, whether storage space of the leaf node is full is first determined. When the storage space of the leaf node is full, the accessing apparatus allocates more storage space to the leaf node, and stores the time series data and the offset information of the time series data into the storage space of the leaf node.

Preferably, after allocating more storage space to the leaf node, the accessing apparatus first copies the originally stored time series data and corresponding offset information to new storage space, and then inserts the current time series data and offset information.

According to a more preferable solution of the present solution, when querying the leaf node, the accessing apparatus respectively determines whether a storage element corresponding to each piece of information in the time offset information exists. When the storage element corresponding to each piece of information in the time offset information does not exist, the new storage element is created.

Specifically, the accessing apparatus determines whether the time tree corresponding to the hour information exists according to the hour information in the time offset information, and when the time tree does not exist, a new time tree corresponding to the hour information is created; next, the accessing apparatus determines whether a minute element corresponding to the minute information exists in a local time tree corresponding to the hour information according to the minute information in the time offset information, and when there does not exist the minute element, a new minute element corresponding to the minute information is created; and then, the accessing apparatus determines whether the leaf node corresponding to the offset information exists in a minute node corresponding to the hour information, according to the offset information in the time offset information, and when there does not exist the leaf node, a new leaf node corresponding to the offset information is created.

Preferably, the time tree includes a piece of space size information, and the space size information is used to indicate a maximum value of array space currently used in each leaf node.

When the new leaf node is created, storage space corresponding to the to be created new leaf node is determined according to a leaf node having largest space in the time tree corresponding to the to be created new leaf node.

Preferably, when the new space allocated to the leaf node by the accessing apparatus is larger than the space size information in the foregoing time tree, the space size information of the time tree is updated to size information of the new space.

According to a preferable solution of the present disclosure, when the accessing apparatus writes/reads the time series data, data in a corresponding storage structure are locked.

Specifically, when the accessing apparatus queries the storage structure corresponding to the offset information in the leaf node, the leaf node is first locked to keep data in the leaf node from being read/written by other users at the same time. After corresponding time series data are read/written, the leaf node is unlocked to allow other users to read/write the data in the leaf node.

Preferably, the corresponding leaf node is locked before the operation performed by the first querying unit 3 or the third querying unit, and unlocked after the operation performed by the second querying unit 4 or the inserting unit performs.

According to the solution of the present disclosure, by creating a two-level tree structure, a time complexity of finding the leaf node at the root node of the time tree is only $O(1)$, while a time complexity of finding in the leaf node is $O(\log N)$ since a method such as a bisection method may be used. Apparently, compared with $O(N)$ in the existing techniques, the present solution has a lower complexity and improves query efficiency of time series data. In addition, compared with the binary tree in the existing techniques, the data structure according to the present disclosure occupies less memory, and can conveniently implement cleaning for stale data in units of hours by using the two-level index at the hour information. Moreover, in the solution, a situation of writing out of sequence can also be easily supported.

It is apparent to those skilled in the art that the present disclosure is not limited to the details of the foregoing exemplary embodiments, and can be implemented in other specific forms without departing from the spirit or basic features of the present disclosure. Therefore, in any way, the examples should be regarded as exemplary, not limitative; and the scope of the present disclosure is limited by the appended claims, instead of the above depiction. Thus, all variations intended to fall into the meaning and scope of equivalent elements of the claims should be covered within the present disclosure. No reference signs in the claims should be regarded as limiting the involved claims. Besides, it is apparent that the term "comprise" does not exclude other units or steps, and singularity does not exclude plurality. A plurality of units or modules stated in a system claim may also be implemented by a single unit or module through software or hardware. Terms such as the first and the second are used to indicate names, but do not indicate any particular sequence.

What is claimed is:

1. A method for accessing time series data in a computer memory, the method comprising:
    electronically storing time series data in a data structure including a two-level index and one or more time trees, the two-level index storing logical pointers that point to logical memory locations of the one or more time trees;
    receiving time series query information for accessing corresponding time series data,
    wherein the two-level index includes a primary index and a secondary index,
    wherein the primary index is organized as an array that includes a plurality of hour pointers, where each hour pointer corresponds to an hour and points to the secondary index,
    wherein the secondary index includes:
        hour information of the hour, the hour information being based on time point information expressed in seconds, and
        a pointer to a time tree corresponding to the hour;
    wherein the pointer to the time tree points to a respective time tree of the one or more time trees, the respective time tree having one root node being a minute array, each element of the minute array corresponding to each minute pointer, the minute pointer being directly connected to a plurality of leaf nodes;
    determining corresponding time offset information based on the received time series query information, the time offset information comprising the hour information, minute information and offset information;
    acquiring a corresponding hour pointer in the primary index based on the hour information of the time offset information to determine the corresponding secondary index, and finding a corresponding time tree based on the corresponding secondary index based on the hour information expressed in seconds;
    finding a corresponding leaf node in logical memory locations storing the corresponding time series data in the corresponding time tree based on the minute information of the time offset information and a corresponding minute pointer; and
    querying in the found corresponding leaf node based on the offset information of the time offset information, to acquire the corresponding time series data.

2. The method according to claim 1, wherein each of the one or more time trees comprises minute elements corresponding to each minute of the hour, each of the minute elements pointing to a respective leaf node of the plurality of leaf nodes, wherein the respective leaf node stores respective time series data and offset information corresponding to the respective time series data.

3. The method according to claim 1, the method further comprises:
    determining whether out-of-order inserted time series data exists in the leaf node; and
    sorting the corresponding time series data based on the offset information, when the out-of-order inserted time series data exists.

4. The method according to claim 1, further comprising:
    acquiring the time series data;
    determining the time offset information of the time series data according to the time point information of the time series data;
    finding the leaf node in the time tree corresponding to the time offset information according to the time offset information; and
    inserting the time series data and the offset information corresponding to the time series data into the leaf node after the leaf node is found.

5. The method according to claim 4, wherein the inserting the time series data and the offset information corresponding to the time series data into the leaf node further comprises:
    allocating more storage space to the leaf node when storage space of the leaf node is full; and
    storing the time series data and the offset information of the time series data into the storage space of the leaf node.

6. The method according to claim 5, further comprising:
    determining respectively whether a storage structure corresponding to each piece of information in the time offset information exists; and
    creating a new storage structure when the storage structure corresponding to each piece of information in the time offset information does not exist.

7. The method according to claim 6, wherein, the determining respectively whether a storage structure corresponding to each piece of information in the time offset information exists comprises:
    determining whether the leaf node corresponding to the offset information exists; and
    creating a new leaf node when the leaf node does not exist.

8. The method according to claim 7, wherein the creating a new leaf node further comprises:
    determining storage space corresponding to the to be created new leaf node according to a leaf node having largest space in the time tree corresponding to the to be created new leaf node.

9. The method according to claim 1, further comprising:
    locking data in the corresponding storage structure when the time series data are written/read.

10. The method according to claim 1, wherein respective ones of the minute pointers pointing to a respective leaf node in the plurality of leaf nodes.

11. An apparatus for accessing time series data in a computer memory, the apparatus comprising:
    at least one processor;
    a data structure storing time series data including a two-level index and one or more time trees, the two-level index storing logical pointers that point to logical memory locations of the one or more time trees;
    a memory storing instructions, which when executed by the at least one processor, cause the at least one processor to perform operations, the operations comprising:
        receiving time series query information for accessing corresponding time series data,
        wherein the two-level index includes a primary index and a secondary index, wherein the primary index is organized as an array that includes a plurality of hour pointers, where each hour pointer corresponds to an hour and points to the secondary index, wherein the secondary index includes:

hour information of the hour, the hour information being based on time point information expressed in seconds, and a pointer to a time tree corresponding to the hour;

wherein the pointer to the time tree points to a respective time tree of the one or more time trees having one root node being a minute array, each element of the minute array corresponding to a minute pointer, the minute pointer being directly connected to the plurality of leaf nodes;

determining corresponding time offset information based on the received time series query information, the time offset information comprising the hour information, minute information, and offset information;

acquiring a corresponding hour pointer in the primary index based on the hour information of the time offset information to determine the corresponding secondary index, and finding a corresponding time tree based on the corresponding secondary index based on the hour information expressed in seconds;

finding a corresponding leaf node in logical memory locations storing the corresponding time series data in the corresponding time tree based on the minute information of the time offset information and a corresponding minute pointer; and querying in the found corresponding leaf node based on the offset information of the time offset information, to acquire the corresponding time series data.

12. The apparatus according to claim 11, the operations further comprising:

determining whether out-of-order inserted time series data exists in the leaf node; and sorting the corresponding time series data based on the offset information, when the out-of-order inserted time series data exists.

13. The apparatus according to claim 11, the operations further comprising:

acquiring the time series data;

determining the time offset information of the time series data according to time point information of the time series data;

finding the leaf node in the time tree corresponding to the time offset information according to the time offset information; and inserting the time series data and the offset information corresponding to the time series data into the leaf node after the leaf node is found.

14. The apparatus according to claim 13, the operations further comprising:

allocating more storage space to the leaf node when storage space of the leaf node is full; and storing the time series data and the offset information of the time series data into the storage space of the leaf node.

15. The apparatus according to claim 14, the operations further comprising:

determining respectively whether a storage structure corresponding to each piece of information in the time offset information exists; and creating a new storage structure when the storage structure corresponding to each piece of information in the time offset information does not exist.

16. The apparatus according to claim 15, wherein, the determining respectively whether a storage structure corresponding to each piece of information in the time offset information exists comprises:

determining whether the leaf node corresponding to the offset information exists; and creating a new leaf node when the leaf node does not exist.

17. The apparatus according to claim 16, the operations further comprising:

determining storage space corresponding to the to be created new leaf node according to a leaf node having largest space in the time tree corresponding to the to be created new leaf node.

18. The apparatus according to claim 11, the operations further comprising:

locking data in the corresponding storage structure when the time series data are written/read.

19. A non-transitory computer storage medium storing a computer program, which when executed by one or more processors, causes the one or more processors to perform operations, the operations comprising:

electronically storing time series data in a data structure including a two-level index and one or more time trees, the two-level index storing logical pointers that point to logical memory locations of the one or more time trees;

receiving time series query information for accessing corresponding time series data, wherein the two-level index includes a primary index and a secondary index, wherein the primary index is organized as an array that includes a plurality of hour pointers, where each hour pointer corresponds to an hour and points to the secondary index, wherein the secondary index includes:

hour information of the hour, the hour information being based on time point information expressed in seconds, and a pointer to a time tree corresponding to the hour;

wherein the pointer to the time tree points to a respective time tree of the one or more time trees, the respective time tree having one root node being a minute array, each element of the minute array corresponding to each minute pointer, the minute pointer being directly connected to a plurality of leaf nodes;

determining corresponding time offset information based on the received time series query information, the time offset information comprising the hour information, minute information and offset information;

acquiring a corresponding hour pointer in the primary index pointing to a corresponding secondary index based on the hour information of the time offset information, and finding a corresponding time tree in the one or more time trees based on the corresponding secondary index based on the hour information expressed in seconds;

finding a corresponding leaf node in logical memory locations storing the corresponding time series data in the corresponding time tree based on the minute information of the time offset information and a corresponding minute pointer; and querying in the found corresponding leaf node based on the offset information of the time offset information, to acquire the corresponding time series data.

\* \* \* \* \*